United States Patent
Fink et al.

(10) Patent No.: US 9,541,428 B2
(45) Date of Patent: Jan. 10, 2017

(54) INTERFACE BETWEEN A SENSOR UNIT AND AN EXPLOSION RESISTANT HOUSING

(71) Applicant: Endress + Hauser Flowtec AG, Reinach (CH)

(72) Inventors: Nikolai Fink, Aesch (CH); Markus Beissert, Freiburg (DE); Frank Bonschab, Sr., Rummingen (DE); Bjorn Larsson, Birsfelden (CH); Bruno Worreth, Kiffis (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 14/425,677

(22) PCT Filed: Aug. 28, 2013

(86) PCT No.: PCT/EP2013/067782
§ 371 (c)(1),
(2) Date: Mar. 4, 2015

(87) PCT Pub. No.: WO2014/037258
PCT Pub. Date: Mar. 13, 2014

(65) Prior Publication Data
US 2015/0211902 A1    Jul. 30, 2015

(30) Foreign Application Priority Data

Sep. 10, 2012 (DE) .................... 10 2012 108 415

(51) Int. Cl.
*G01D 11/24* (2006.01)
*G01F 15/14* (2006.01)
(Continued)

(52) U.S. Cl.
CPC .............. *G01D 11/245* (2013.01); *G01F 15/14* (2013.01); *H01R 4/023* (2013.01); *H01R 13/5216* (2013.01); *H01R 13/6588* (2013.01)

(58) Field of Classification Search
USPC .......................................................... 73/431
See application file for complete search history.

(56) References Cited

U.S. PATENT DOCUMENTS 3,591,861 A    7/1971 Sonderegger
3,884,078 A    5/1975 Zeiringer
(Continued)

FOREIGN PATENT DOCUMENTS

CH    416149 A    6/1964
CN    1989663 A    6/2007
(Continued)

OTHER PUBLICATIONS

English Translation of the International Preliminary Report on Patentability, WIPO, Geneva, Mar. 19, 2015.
(Continued)

*Primary Examiner* — Lisa Caputo
*Assistant Examiner* — Jamel Williams
(74) *Attorney, Agent, or Firm* — Bacon & Thomas, PLLC

(57) ABSTRACT

An interface between a sensor unit and an explosion resistant housing, wherein arranged in the explosion resistant housing is a measurement amplifier. In the interface, which is simply manufacturable and, despite that, meets the requirements of explosion protection, the measurement amplifier is arranged on a plug unit formed in the sensor unit and preferably protruding inwardly into the explosion resistant housing.

18 Claims, 2 Drawing Sheets

(51) Int. Cl.
*H01R 4/02* (2006.01)
*H01R 13/52* (2006.01)
*H01R 13/6588* (2011.01)

(56) References Cited

U.S. PATENT DOCUMENTS

| | | | |
|---|---|---|---|
| 5,954,526 | A | 9/1999 | Smith |
| 6,109,979 | A | 8/2000 | Garnett |
| 6,476,520 | B1 | 11/2002 | Bohm |
| 6,705,898 | B2 | 3/2004 | Pechstein |
| 8,528,401 | B2 | 9/2013 | Schulze |
| 9,030,190 | B2 * | 5/2015 | Matt .................. 324/156 |
| 2007/0089481 | A1 | 4/2007 | Wansing |
| 2007/0279173 | A1 | 12/2007 | Scholz |
| 2009/0145656 | A1 | 6/2009 | Tschudin |
| 2009/0183575 | A1 | 7/2009 | Matzen |
| 2010/0026518 | A1 | 2/2010 | Kirst |
| 2010/0132480 | A1 | 6/2010 | Bitto |
| 2010/0257930 | A1 * | 10/2010 | Isenmann et al. ......... 73/273 |
| 2011/0023624 | A1 | 2/2011 | Huber |
| 2011/0060534 | A1 | 3/2011 | Karbula |
| 2011/0113896 | A1 | 5/2011 | Drahm |
| 2011/0208440 | A1 | 8/2011 | Pechstein |
| 2011/0317390 | A1 | 12/2011 | Moser |
| 2012/0198931 | A1 * | 8/2012 | Schulze et al. ......... 73/431 |

FOREIGN PATENT DOCUMENTS

| | | |
|---|---|---|
| DE | 3337481 A1 | 4/1985 |
| DE | 3722667 A1 | 10/1987 |
| DE | 19646583 A1 * | 6/1997 |
| DE | 19719730 C1 | 10/1998 |
| DE | 19782057 B4 | 9/1999 |
| DE | 20122781 U1 | 10/2007 |
| DE | 20122808 U1 | 1/2008 |
| DE | 10 2011 010799 A1 | 9/2012 |
| DE | 10 2010 038104 A1 | 12/2012 |
| EP | 1628368 A1 | 2/2006 |
| EP | 2053346 A2 * | 4/2009 |
| FR | 2 469 763 | 5/1981 |
| GB | 1391752 | 4/1975 |
| WO | 2012107208 A2 | 8/2012 |
| WO | WO 2012107208 A2 * | 8/2012 |

OTHER PUBLICATIONS

German Search Report, German PTO, Munich, Aug. 8, 2013.
International Search Report, EPO, The Netherlands, Oct. 22, 2013.
Office Action dated May 19, 2016 issued in corresponding German application No. 13 753 184.4.

* cited by examiner

INTERFACE BETWEEN A SENSOR UNIT AND AN EXPLOSION RESISTANT HOUSING

TECHNICAL FIELD

The invention relates to an interface between a sensor unit and an explosion resistant housing, wherein arranged in the explosion resistant housing is a measurement amplifier.

BACKGROUND DISCUSSION

In process control technology, which preferably is applied for monitoring processes in the chemical industry or in flowing or standing bodies of water, sensors are arranged in a measuring environment. These sensors measure the properties of a medium to be examined and are connected with a locally removed, process control center. In order to be able to operate such a sensor, there is arranged on a sensor unit comprising the sensor an explosion resistant housing, which contains electrical components. Included among the electrical components is a measurement amplifier, which drives the sensor and evaluates the signals output by the sensor. This measurement amplifier is connected with the sensor unit via a number of interfaces.

For mechanical connection, the explosion resistant housing includes a holder, which bears a circuit board, on which the measurement amplifier is secured. The electrical connection goes from the cable connected sensor to a feedthrough for the conductors of the cable. The feedthrough is introduced into the housing of the sensor unit. In such case, the conductors of the cable coming from the sensor are soldered on one side of the feedthrough with leads of the feedthrough, while on the other side of the feedthrough likewise conductors of a cable are soldered to leads of the feedthrough, and this cable goes to the measurement amplifier. The conductors of the cable leading to the measurement amplifier are soldered to an additional, explosion resistant feedthrough, which closes the explosion resistant housing off. On the other side of the explosion resistant feedthrough, cable is led directly to the measurement amplifier and then connected with the measurement amplifier by means of a plug. Such an electrical connection is not only constructively very complex and, thus, very costly, but, also, means a significant manufacturing effort.

SUMMARY OF THE INVENTION

An object of the invention is to provide an interface between a sensor unit and an explosion resistant housing, which interface enables a cost effective and simple mechanical and electrical connection.

According to the invention, the object is achieved by features including that the measurement amplifier is arranged on a plug unit formed in the sensor unit and preferably protruding inwardly into the explosion resistant housing. This arrangement has the advantage that the measurement amplifier is connected by means of a single connection directly with the sensor unit electrically and mechanically. Savings of material and manufacturing effort reduce the costs for this interface. The plug unit is an integral component of the sensor unit and forms simultaneously a closure for the sensor unit. The proposed solution simplifies the interface between sensor unit and measurement amplifier, whereby besides cost reduction also reduction of defect susceptibility is provided. Lessening the electrical interfaces improves the signal and enables a compact formation of devices.

Advantageously, the plug unit is embodied plug- or socket like for manufacture of an electrical connection, wherein a socket carrying the measurement amplifier or a plug carrying the measurement amplifier is placed on the plug unit. Because the interface is composed of two fitting counterparts, a simple electrical as well as also mechanical connection between the measurement amplifier and the sensor unit is provided.

In an embodiment, the plug unit includes at least two chambers for spatial isolation of conductors from conductors with different signals. Because conductors, which carry signals of high power are arranged in another chamber than conductors, which carry signals with low power, an electromagnetic decoupling of these conductors from one another is achieved, so that the signals with low power remain uninfluenced by the signals with high power. Therefore, the signals can be reliably evaluated in the measurement amplifier.

In an additional form of embodiment, the conductors are arranged grouped or isolated for positioning in the at least two chambers. Due to the grouping of the conductors as a function of their signal strengths, electromagnetic compatibility of the signals led in the plug unit is improved.

In a variant, the conductors are embodied as pin contacts, which are soldered in the region of the sensor unit with signal lines of a sensor and/or accept the socket carrying the measurement amplifier or the plug carrying the measurement amplifier. This one plug unit connects the measurement amplifier with the sensor unit in minimum space, even though the properties of the sensor signals and the measurement amplifier signals are different as regards their power. Thus, a robust, small, electromagnetically compatible, connecting unit is implemented for electrical connection between measurement amplifier and sensor.

In a further development, the conductors in the plug unit are potted for fulfilling the requirements for pressure resistant encapsulation. In such case, the potting compound is so selected that it meets the requirements for chemical durability. Through this potting, the plug unit is embodied to be explosion safe. Thus, possible explosions, which can be caused by the electronic components arranged in the explosion resistant housing, are not propagated to the sensor unit, but, instead, remain locally bounded in the explosion resistant housing. In this way, the requirements for explosion protection are met.

Alternatively, the conductors are led through a metal plate for achieving a gas-sealed connection, wherein the conductors are insulated from the metal plate by means of welded glass. Also, this embodiment of the interface fulfills the requirements for pressure resistant encapsulation.

Advantageously, the conductors are electrically isolated from one another by at least one metal web connected with ground. Therewith, the exciter signals emanating from the measurement amplifier and the sensor signals delivered from the sensor are electromagnetically decoupled from one another. Since the metal webs are connected with protective earth or with ground, they block crosstalk between the conductors.

In an embodiment, a sensor unit housing part surrounding the plug unit bears a screw thread, on which the explosion resistant housing is screwed on, wherein the screw thread is preferably embodied explosion-resistantly. This explosion resistant screw thread seals the explosion resistant housing, wherein the plug carrying the measurement amplifier, respectively the socket carrying the measurement amplifier, is located in the interior of the explosion resistant housing.

In a variant, a locking element is provided on the housing for setting a predetermined twist position between sensor unit and explosion resistant housing. Thus, it is enabled that different amounts of rotation can be set between the sensor unit and the explosion resistant housing. As soon as the desired position relative to one another is set, the explosion resistant housing is locked in position. This locking can occur preferably by a screw, which is led through the explosion resistant housing to the part of the sensor unit bearing the plug unit. In such case, the locking can be above or below the thread.

BRIEF DESCRIPTION OF THE DRAWINGS

The invention permits numerous forms of embodiment. One thereof will now be explained in greater detail based on the drawing, the figures of which show as follows.

DETAILED DISCUSSION IN CONJUNCTION WITH THE DRAWINGS

Figure 1:
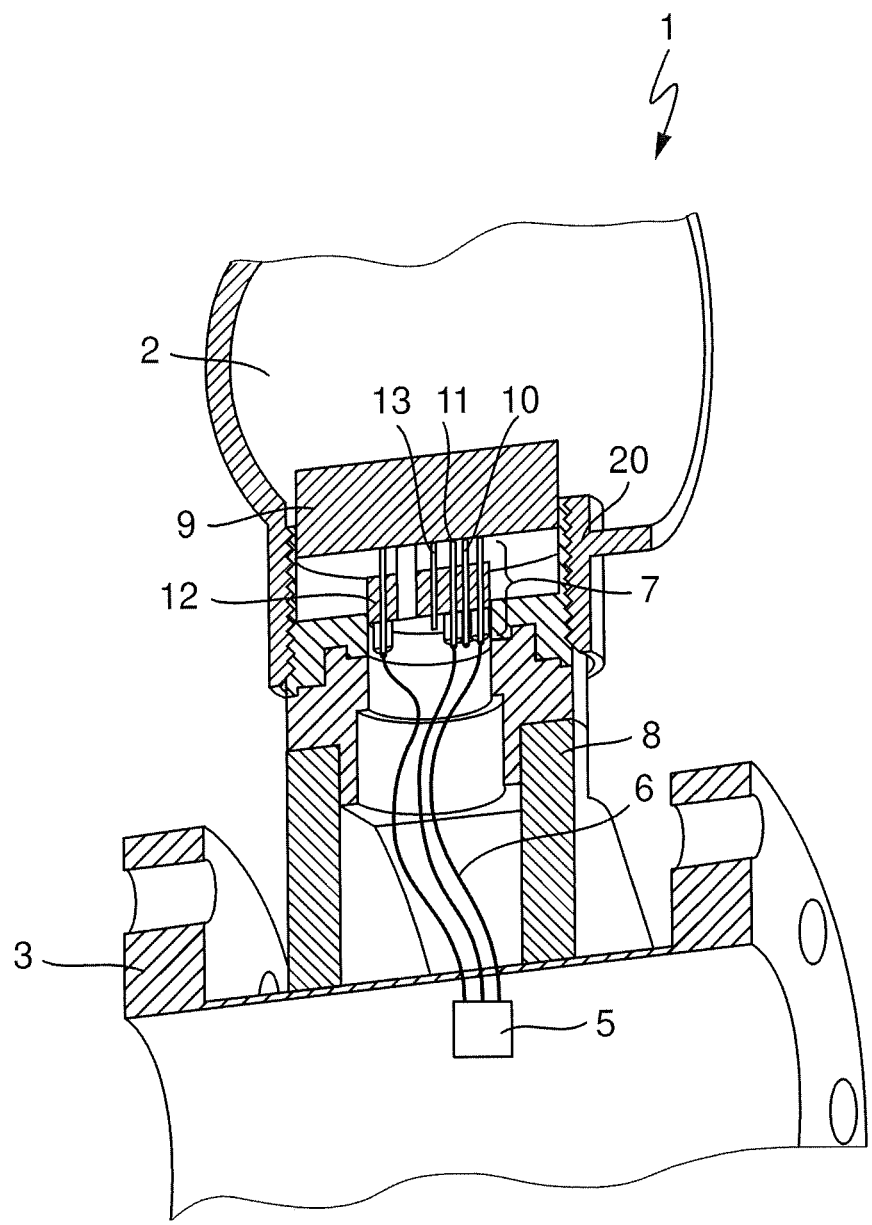
FIG. 1 is a section through a sensor unit connected with an explosion resistant housing.

Equal features are provided with equal reference characters in the figures of the drawing.

FIG. 1 shows a section through a sensor apparatus, which is embodied as a flow measuring unit 1 and composed of an explosion resistant housing 2 and a sensor unit 3. The flow measuring unit 1 possesses at least one sensor 5, which is associated with a pipe, or tube, 4, wherein the sensor 5 measures the flow of a medium flowing through the pipe, or tube, 4. Via a sensor cable 6, the sensor 5 is connected with a plug unit 7, which is arranged in a sensor neck 8 of the sensor unit 3. Plug unit 7 is, in such case, an integral component of the sensor unit 3. Plug unit 7 includes pin contacts 10, which are soldered to the respective conductors of the sensor cable 6. On the other side of the plug unit 7 facing the explosion resistant housing 2, a measurement amplifier 9, which is arranged within the explosion resistant housing 2, is superimposed on the pin contacts 10. The side of the plug unit 7 facing the measurement amplifier 9 is embodied as a plug, on which a socket plug 18 of the measuring amplifier 9 sits, by means of which the measurement amplifier 9 is mechanically and electrically connected with the plug unit 7.

Arranged in the explosion resistant housing 2 besides the measurement amplifier 9 are yet other electronic components (not shown), such as, for example, a power supply, a fieldbus and in- and output electronics.

The pin contacts 10 of the plug unit 7 are potted to a height of at least 1 cm. This potting, which extends transversely to the pin contacts 10, surrounds the pin contacts 10 securely and assures that in the case of a possible explosion of an electronic component by spark formation in the explosion resistant housing 2, such explosion remains limited to the explosion resistant housing 2 and cannot propagate to the sensor unit 3.

Moreover, the plug unit 7 includes, extending between at least two neighboring pin contacts 10, at least one metal web 13, which provides an electromagnetic shielding of at least of one of the two neighboring pin contacts 10 from the other of the two neighboring pin contacts 10, consequently to an electromagnetic decoupling between signals, which are led through the pin contacts 10 and can have different powers. Due to the grouping, respectively separating, of the pin contacts 10 and by the application of one or more such metal webs 13 within the plug unit 7, the exciter signals, which are transmitted from the measurement amplifier 9, and sensor signals, which are forwarded by the sensor 5 as measurement signals to the measurement amplifier 9, are isolated from one another, so that they are electrically decoupled. The metal webs 13 can additionally be connected with protective earth or ground, whereby also a signal in-coupling from outside of the plug unit into the pin contacts 10 can be suppressed.

Figure 2:
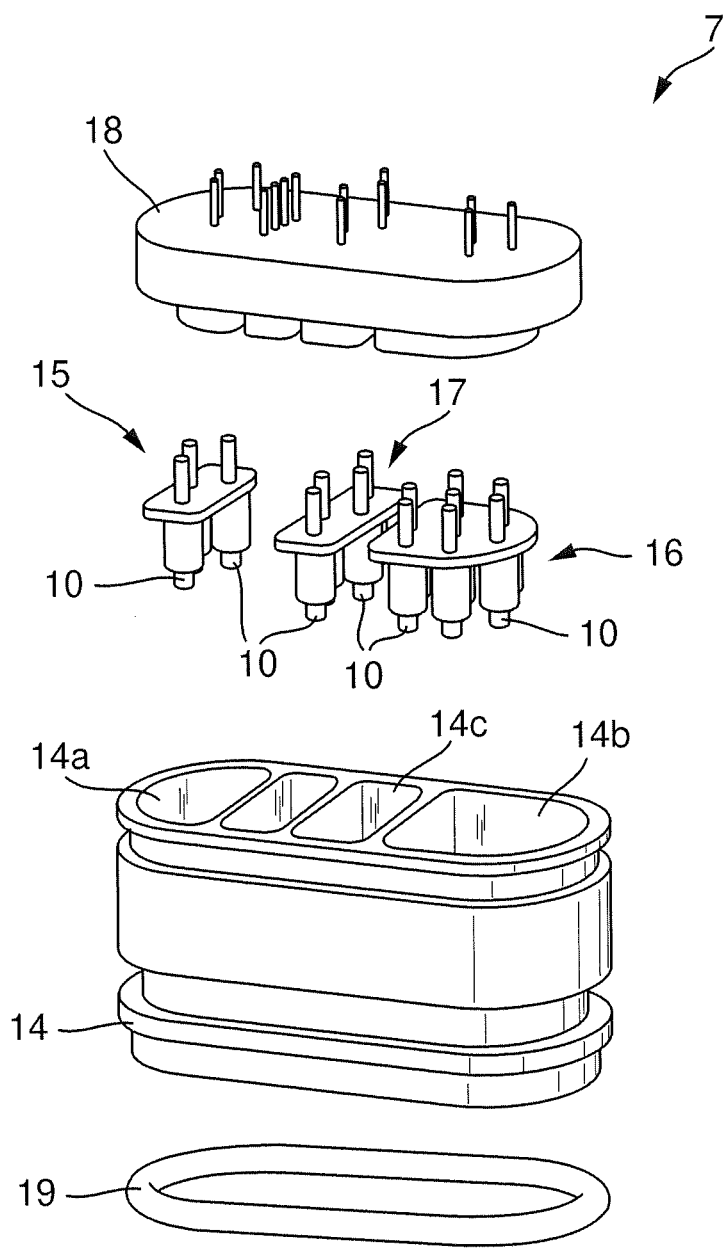
FIG. 2 is an exploded view of the plug unit.

FIG. 2 shows an exploded view of the plug unit 7. Plug unit includes a four chamber-plug housing 14 of aluminum. Inserted in these four chambers of the plug housing 14 are different groupings of pin contacts 10. Thus, in the first chamber 14a is a first grouping 15 of pin contacts 10, by which the measurement amplifier 9 drives the sensor 5. In a second chamber 14b, which is embodied on the side of the plug housing 14 opposite the chamber 14a, is a second group 16 of pin contacts 10, which transmit to the measurement amplifier 9 the signals output from the sensor 5. A third group 17 of plug contacts 10 is arranged in the third chamber 14c between the first chamber 14a and the second chamber 14b. By means of this group 17 of plug contacts 10, supplemental signals are transmitted by the measurement amplifier 9 to the sensor 5. Since, in the driving of the sensor 5 by the measurement amplifier 9, signals are transmitted by means of high power, this first group 15 of pin contacts 10 is arranged exactly on the opposite side from the pin contacts 10, which are combined into the second group 16 and deliver very weak sensor signals to the measurement amplifier 9. By this spatial isolation of these plug groups 15, respectively 16, it is assured that there occurs no mutual influencing of the signals, which are led through the second plug group 16 and have only a very low power, by the signals of the first plug group 15 having a high power.

Superimposed on the pin contacts 10 of the groups 15, 16 and 17 is a socket plug 18, which is placed in the end state on the measurement amplifier. The so embodied plug unit 7 assures that no electromagnetic influencing of the pin contacts 10 occurs, even though these are arranged with relatively close spacing next to one another. The four chamber, plug housing 14 is, in such case, a built-in component of the sensor neck 8 or so connected with such, that it meets the requirements for pressure resistant encapsulation.

An external thread is provided on the sensor unit 3 on its sensor neck 8 for mechanical connection of the explosion resistant housing 2 with the sensor unit 3. The explosion resistant housing 2 possesses a corresponding internal thread, which is screwed onto the external thread of the sensor unit 3. Inner and outer threads are screwed at least seven revolutions relative to one another, in order to achieve an explosion resistant screw thread 20 (FIG. 1). Such an explosion resistant screw thread 20 meets the requirements for pressure resistant encapsulation, which prevents explosions from being propagated to the environment. In such case, the sensor unit 3 seals the explosion resistant housing 2, in which the measurement amplifier 9 is arranged. The socket plug 18 of the measuring amplifier 9 is arranged in the interior of the explosion resistant housing 2. Since the measurement amplifier 9 works according to measuring principles, which are executed with a high energy, it must be arranged in the explosion protected housing 2.

The sensor unit 2 can alternatively, however, also be provided with a non-explosion resistant interface, wherein an explosion resistant interface is plugged as intermediate plug onto the non-explosion resistant interface. In this regard, the signals, which are led through the interface, must be so embodied that the driver- and sensor signals are arranged significantly isolated from one another.

The invention claimed is:

1. An interface between a sensor unit and an explosion resistant housing, wherein:
arranged in said explosion resistant housing is a measurement amplifier;
said measurement amplifier is arranged on a plug unit formed in said sensor unit;
a sensor unit housing part surrounding said plug unit bears a screw thread, on which said explosion resistant housing is screwed on; and
a locking element is provided on said housing for setting a predetermined twist position between sensor unit and said explosion resistant housing.

2. The interface as claimed in claim 1, wherein:
said plug unit is embodied plug- or socket like for manufacture of an electrical connection; and
a socket carrying said measurement amplifier, or a plug carrying said measurement amplifier, is placed on said plug unit.

3. The interface as claimed in claim 1, wherein:
said plug unit includes at least two chambers for spatial isolation of conductors with different signals.

4. The interface as claimed in claim 3, wherein:
said conductors are arranged grouped or isolated for positioning in said at least two chambers.

5. The interface as claimed in claim 3, wherein:
said conductors are embodied as pin contacts, which are soldered in the region of said sensor unit with signal lines of a sensor.

6. An interface between a sensor unit and an explosion resistant housing, wherein:
arranged in said explosion resistant housing is a measurement amplifier;
said measurement amplifier is arranged on a plug unit formed in said sensor unit;
said plug unit includes at least two chambers for spatial isolation of conductors with different signals; and
said conductors in said plug unit are potted for pressure resistant encapsulation.

7. An interface between a sensor unit and an explosion resistant housing, wherein:
arranged in said explosion resistant housing is a measurement amplifier;
said measurement amplifier is arranged on a plug unit formed in said sensor unit;
said plug unit includes at least two chambers for spatial isolation of conductors with different signals;
said conductors are led through a metal plate for achieving a pressure resistant encapsulation and a gas-sealed connection; and
said conductors are insulated from said metal plate by means of welded glass.

8. An interface between a sensor unit and an explosion resistant housing, wherein:
arranged in said explosion resistant housing is a measurement amplifier;
said measurement amplifier is arranged on a plug unit formed in said sensor unit;
said plug unit includes at least two chambers for spatial isolation of conductors with different signals; and
said conductors are electrically shielded from one another by at least one metal web.

9. The interface as claimed in claim 6, wherein:
a sensor unit housing part surrounding said plug unit bears a screw thread, on which said explosion resistant housing is screwed on.

10. The interface as claimed in claim 9, wherein:
a locking element is provided on said housing for setting a predetermined twist position between sensor unit and said explosion resistant housing.

11. The interface as claimed in claim 1, wherein the plug unit protrudes inwardly into said explosion resistant housing.

12. The interface as claimed in claim 1, wherein:
said plug unit is embodied plug like for manufacture of an electrical connection; and
a socket carrying said measurement amplifier carrying said measurement amplifier is placed on said plug unit.

13. An interface between a sensor unit and an explosion resistant housing, wherein:
arranged in said explosion resistant housing is a measurement amplifier;
said measurement amplifier is arranged on a plug unit formed in said sensor unit;
said plug unit is embodied socket like for manufacture of an electrical connection; and
a plug carrying said measurement amplifier, is placed on said plug unit.

14. The interface as claimed in claim 3, wherein:
said conductors are embodied as pin contacts, which accept said socket carrying said measurement amplifier.

15. The interface as claimed in claim 3, wherein:
said conductors are embodied as pin contacts, which accept said plug carrying said measurement amplifier.

16. The interface as claimed in claim 3, wherein:
said conductors are arranged isolated for positioning in said at least two chambers.

17. The interface as claimed in claim 8, wherein:
the at least one metal web is connected with ground.

18. The interface as claimed in claim 1, wherein:
the screw thread is embodied explosion-resistantly.

* * * * *